United States Patent [19]

Benson et al.

[11] Patent Number: 4,683,154
[45] Date of Patent: Jul. 28, 1987

[54] LASER SEALED VACUUM INSULATION WINDOW

[75] Inventors: David K. Benson; C. Edwin Tracy, both of Golden, Colo.

[73] Assignee: The United States of America as represented by the United States Department of Energy, Washington, D.C.

[21] Appl. No.: 767,218

[22] Filed: Aug. 19, 1985

[51] Int. Cl.[4] .......................... E06B 3/24; E06B 7/12; B32B 17/00

[52] U.S. Cl. ........................................ 428/34; 52/171; 52/741; 52/788; 156/107; 156/109

[58] Field of Search .................... 428/34; 52/171, 172, 52/741, 788; 156/107, 109

[56] References Cited

U.S. PATENT DOCUMENTS

| | | | |
|---|---|---|---|
| 3,960,534 | 6/1976 | Oates | 65/43 |
| 3,990,201 | 11/1976 | Falbel | 52/171 |
| 4,039,718 | 8/1977 | Kallenborn | 428/398 |
| 4,198,254 | 4/1980 | LaRoche et al. | 156/107 |
| 4,204,015 | 5/1980 | Wardlaw et al. | 428/34 |
| 4,339,482 | 7/1982 | Glaser et al. | 428/13 |

FOREIGN PATENT DOCUMENTS 1138992 1/1969 United Kingdom .

Primary Examiner—John E. Kittle
Assistant Examiner—Patrick J. Ryan
Attorney, Agent, or Firm—Kenneth L. Richardson; John M. Albrecht; Judson R. Hightower

[57] ABSTRACT

A laser sealed evacuated window panel is comprised of two glass panes held spaced apart in relation to each other by a plurality of spherical glass beads and glass welded around the edges to provide an evacuated space between the glass panes that is completely glass sealed from the exterior. The glass welded edge seal is obtained by welding the edges of the glass panes together with a laser beam while the glass panes and bead spacers are positioned in a vacuum furnace and heated to the annealing point of the glass to avoid stress fracture in the area of the glass weld. The laser welding in the furnace can be directed around the perimeter of the glass panel by a combination of rotating the glass panel and linearly translating or aiming the laser with a relay mirror.

19 Claims, 8 Drawing Figures

LASER SEALED VACUUM INSULATION WINDOW

CONTRACTUAL ORIGIN OF THE INVENTION

The U.S. Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

This invention is generally related to thermal insulated windows and more specifically to a vacuum-sealed glass thermal pane window and a method of sealing same using laser energy.

2. Description of the Prior Art

Panes of glass are in common use in situations wherein it is desired to allow visible light into a structure while preventing heat from escaping. Such situations include windows in buildings and solar collector panels. In solar heating applications, both in active solar heating systems where solar collector panels are used to capture solar energy and in passive solar heated buildings where solar energy is admitted through large window areas, the heat gain over a period of time is a very important consideration that needs improvement. The heat gain is the difference between the heat energy collected in the structure from the sun's radiation less the heat lost from the structure. The ideal window or glass panel, therefore, would be one that is completely transparent to solar radiation and a perfect heat insulator. Such an ideal is, or course, unattainable, but improvements toward that ideal could significantly increase the efficiency of active and passive solar heating systems.

It is well known and generally accepted that multiple, parallel, spaced-apart panes of glass provide more resistance to heat transfer than single panes of glass. An example of such a thermal pane window is shown in U.S. Pat. No. 4,295,305, issued to L. Shelver. Such thermal pane windows, as illustrated in the Shelver patent with two parallel, spaced apart panes of glass with an edge seal comprised of plastic, mastic, silicone, caulk, or the like, are generally effective to provide an R value of about 2.5 to 2.6. (R value is a standard unit indicative of resistance to heat transfer through a substance in terms of $°F\text{-}ft^2hr/BTU$.)

The air space between the panes inhibits direct conductance of the heat through the window; however, it does not inhibit heat loss by radiation. Further, it is known that the heat energy causes convection currents of air in the space between the panes. Such convection currents are very effective heat transfer vehicles for transferring heat from one pane to the other, thus negating much of the thermal resistance for which the air space between the glass panes is intended.

It is also known that evacuating the air and gases from the space between the glass panes minimizes or nearly eliminates the convection current therein. The U.S. Pat. No. 4,312,457, issued to R. Allaire, and the U.S. Pat. No. 4,393,105, issued to W. Kreisman, illustrate prior art attempts to provide evacuated window panes or structures to increase thermal resistance, i.e., to increase the R value.

Several problems are encountered in the prior art evacuated thermal pane windows. First, the vacuum between the glass panes causes the glass panes to bow or deflect toward each other. Such deflection can cause stress areas or even cracks in the glass. If they deflect enough to touch each other, short circuit heat transfer through direct conduction can occur, thus reducing thermal resistance significantly. The U.S. Pat. No. 3,990,201, issued to Falbel, shows the use of insulation spacers between panes of glass to solve this problem. However, such spacers are difficult to place in mass production, and they do transfer some heat because of their large contact surface areas with the glass panes, particularly when the spacing between the glass is small. Larger spacing between the panes of glass results in undesirable bulkiness. Further, one of the most significant disadvantages of the Falbel approach is that such spacers are visible in transparent glass panels and are unsightly and distracting when used as windows in a building.

Another problem in prior art evacuated thermal pane windows is the difficulty of maintaining the vacuum over long periods of time. In general, the normal atmospheric pressure of about 1000 torr must be reduced to about $10^{-4}$ torr before any insulating benefits occur. To be beneficial in a practical insulating sense the pressure should be reduced even further to about $10^{-6}$ Torr. Sealing such a vacuum over an extended period of time is extremely difficult. Even effective short term seals that give off gases themselves or are even minutely gas permeable cannot maintain this kind of vacuum for very long. Therefore, known prior art seals of plastic, mastic, silicone, Styrofoam insulation, caulk, and the like are practically ineffective for this purpose. To be economical, the vacuum should be maintainable even up to 20–30 years or more. Plastics, silicone pastes, and caulks are permeable to air, and Styrofoam insulation materials give off gases themselves. Exposure to the sun speeds up this process.

Even the electrostatically bonded metal spacer frames taught by U.S. Pat. No. 4,393,105, issued to W. Kreisman, are not effective over longer periods of time. Such metal-to glass seals are subject to chemical attack and degradation, and are also susceptible to fatigue from stress cycles, deformation, and the like.

The prior art has, however, quite successfully solved the problem of reradiation of heat through the glass. For example, it is known that a coating of tin-doped indium oxide (ITO) semiconductor material sputtered onto a glass substrate is selectively transparent to light in the solar spectrum but highly reflective to heat or infrared radiation from heated bodies. Such a tin-doped indium oxide layer deposited on a glass window pane will allow solar radiation, including solar infrared in the range of 2.2 microns wavelength, to pass through the glass into a building or into a solar collector panel while reflecting reradiated heat or infrared in the range of 7 to 10 microns. Thus, the captured heat energy is retained in the building or solar collector and not lost to the atmosphere.

SUMMARY OF THE INVENTION

Accordingly, a general object of the present invention is to provide a more thermal transfer resistant transparent panel for such uses as windows in passive solar heated buildings, solar panels, and the like.

A more specific object of this invention is to provide an evacuated thermal pane glass panel in which an extreme vacuum can be maintained for prolonged periods of time, such as 20 to 30 years or more.

It is also a specific object of this invention to provide an evacuated thermal pane glass structure with effective transparent supports in the space between the glass panels that do not short circuit or transfer any significant amount of heat from one glass pane to the other.

A further specific object of this invention is to provide a method of sealing an evacuated space between adjacent panes of glass in a manner that will hold a vacuum approximately of $10^{-6}$ Torr over a prolonged period of 20 to 30 years or more.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities, combinations, and method particularly pointed out in the appended claims.

To achieve the foregoing and other objects and in accordance with the purposes of the present invention, as embodied and broadly described herein, the article and apparatus of this invention may comprise two adjacent glass panes spaced closely together with a plurality of spherical glass beads positioned between the panes to maintain the spacing therebetween and sealed with a glass seal around the edges. A selectively transparent coating on the interior surface of at least one of the glass panels is provided to reflect heat infrared radiation while allowing solar radiation to pass through. Further, the method of this invention includes depositing a selectively transparent layer on one of two glass panes, attaching a plurality of spherical glass bead spacers to the surface of one or two glass panes, positioning one of the glass panes on the other with the spacers between the two glass panes, positioning this assembly in a vacuum furnace, heating the assembly in a vacuum to the annealing temperature of the glass, and welding the edges of the glass panes together by directing a laser beam of sufficient energy thereon to heat the edges of the glass panes to the melting point. A reactive metal getter can also be positioned in the evacuated space to eliminate trace gases accumulated therein.

BRIEF DESCRIPTION OF THE DRAWINGS

The accompanying drawings, which are incorporated in and form a part of the specifications illustrate the preferred embodiments of the present invention, and together with the description explain the principles of the invention. In the drawings.

DETAILED DESCRIPTION OF THE PREFERRED EMBODIMENTS

Figure 1:
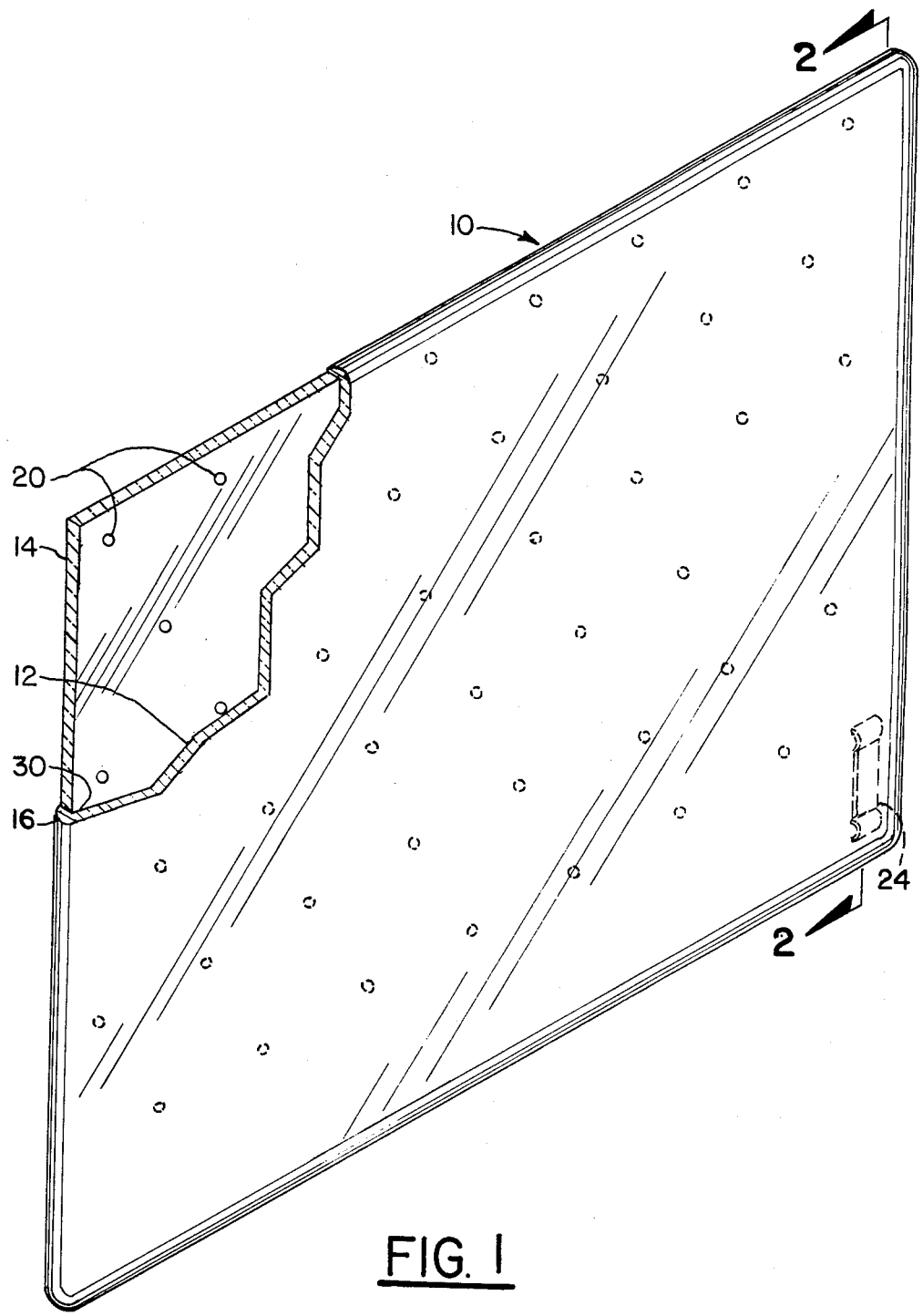
FIG. 1 is a perspective view of the evacuated thermal pane glass panel of the present invention with a portion of a corner broken away to reveal the structure thereof.
Figure 2:
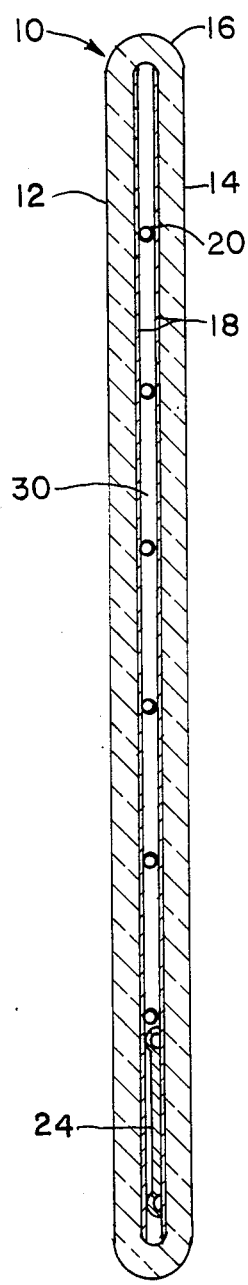
FIG. 2 is a cross-sectional view of the evacuated thermal pane glass panel of the present invention taken along lines 2—2 of FIG. 1.

The laser-sealed vacuum insulating window 10 of the present invention is best shown in FIG. 1, with secondary reference to FIG. 2. The window panel 10 according to the present invention is comprised of two panes of glass 12, 14 positioned adjacent to each other in parallel, closely spaced-apart relation to each other. The edges are sealed together, as indicated at 16, to completely enclose and seal an evacuated space 30 between the glass panes 12, 14. A plurality of spherical glass bead spacers are positioned in spaced apart relation to each other throughout the evacuated space 30 between the glass panes 12, 14 to maintain the distance between the glass panes 12, 14, in spite of the intense vacuum sealed therein. A metal alloy getter 24 is also positioned in the evacuated space 30 for purposes that will be described more fully below.

Referring primarily now to FIG. 2, the spherical glass spacers 20 positioned between the panels 12, 14 maintain the distance and parallel relationship between the glass panels 12, 14. In the absence of the spacers, the extreme vacuum, preferably in the range of $10^{-6}$ Torr would collapse or deform the glass panels 12, 14 into contact with each other, thereby short circuiting thermal transfer of energy directly therethrough by conduction and defeating the insulating purpose of the evacuated space. A selectively transparent coating 18, which is transparent to solar radiation and light in the visible spectrum but is reflective to infrared heat radiation, is deposited on the interior surface of one or both of the glass panels 12, 14.

The glass beads 20 are preferably spherical and approximately 0.5 mm in diameter. The size and spherical shape of such glass beads 20 are significant in this application for several reasons. The spherical shape provides very small area, almost point, contacts between the beads 20 and the glass panes 12, 14. The smaller the sphere diameter, the smaller the contact area. A smaller contact area results in less area for heat conduction, thus more thermal resistance of the glass panel 10. Further, smaller beads 20 have less cross-sectional area and provide less of a conduction path through the bulk of the beads 20 themselves than larger beads. Therefore, thermal resistance of the glass panel 10 increases significantly as the size of the beads 20 is reduced, particularly in the range smaller than 1.0 mm diameter. We have found that a glass panel 10 with beads 20 in the range of about 0.5 mm provides very good thermal resistance. It is possible to use even smaller beads 20 in the range of about 0.3 mm diameter, if the glass panels 12, 14 are very flat. For 0.5 mm diameter beads, spacing between beads 20 in the range of 2.5 to 3.5 cm is satisfactory to maintain the spacing between the glass panels 12, 14.

Another advantage of the glass beads 20 for use as spacers between the glass panes 12, 14 is that they are transparent like the glass. Thus, they are barely visible and do not detract from the appearance of the glass panel 10 or do not block a view therethrough when the glass is used as a window.

According to the present invention, the sealed vacuum insulating window panel 10, which has a highly evacuated space 30 between the two glass panels 12, 14 and an all glass seal 16 around the edges of the individual panels 12, 14 is highly effective as a transparent insulating panel or window. Solar radiation can pass freely therethrough into the interior of a building structure or solar collector panel, however, the heat absorbed inside the building or in a solar collector panel is very effectively prohibited from transfer back through the glass panel 10. The selective coating 18, preferably of a layer of tin-doped indium oxide sputtered onto the surface of the glass, effectively reflects infrared heat radiation back into the building structure or solar panel. Further, the separation of the glass panels 12, 14 by the space 30 prevents conduction of heat from one side of the window 10 to the other. Still further, the extreme vacuum of approximately $10^{-6}$ Torr in the space 30 between the panes 12, 14 efffectively eliminates any convection currents in the space 30 which would otherwise transfer heat from one pane to the other. The result is a transparent window panel 10 that is exceptionally resistant to heat transfer therethrough. Theoretical calculations on window panels 10 constructed according to the present invention have indicated that they are expected to have an R value of approximately of 10 to 12, as opposed to conventional thermal pane windows that have an R value of only about 2.5.

Figure 3:
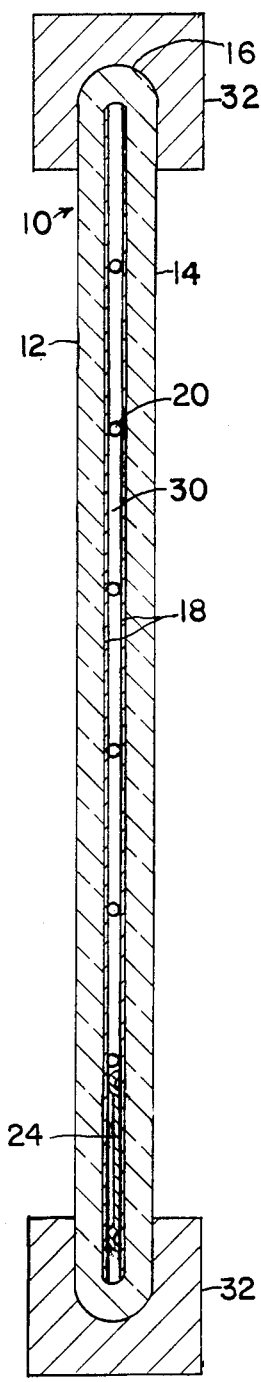
FIG. 3 is a cross-sectional view similar to FIG. 2, but with the addition of an insulating baffle around the edges of the glass panel.

FIG. 3 shows a preferred mounting structure for the evacuated glass panel 10 for the present invention. The edges 16 of the glass panel 10 are preferably embedded in an insulated baffle 32 to minimize thermal conductance losses through the edge seal 16 of the glass panel 10. The edge seals 16 are the only places where a significant cross-section of glass could provide a direct path for heat transfer by conduction from one side of the glass panel 10 to the other. Therefore, in order to prevent such a thermal short circuit, it is important to shield the end seal 16 from exposure to heat to prevent heat transfer therethrough. We have found that thermal resistance of a 1 m² glass panel is decreased by as much as 30% when the edge seals 16 are not shielded by the insulation baffle 32.

Figure 4:
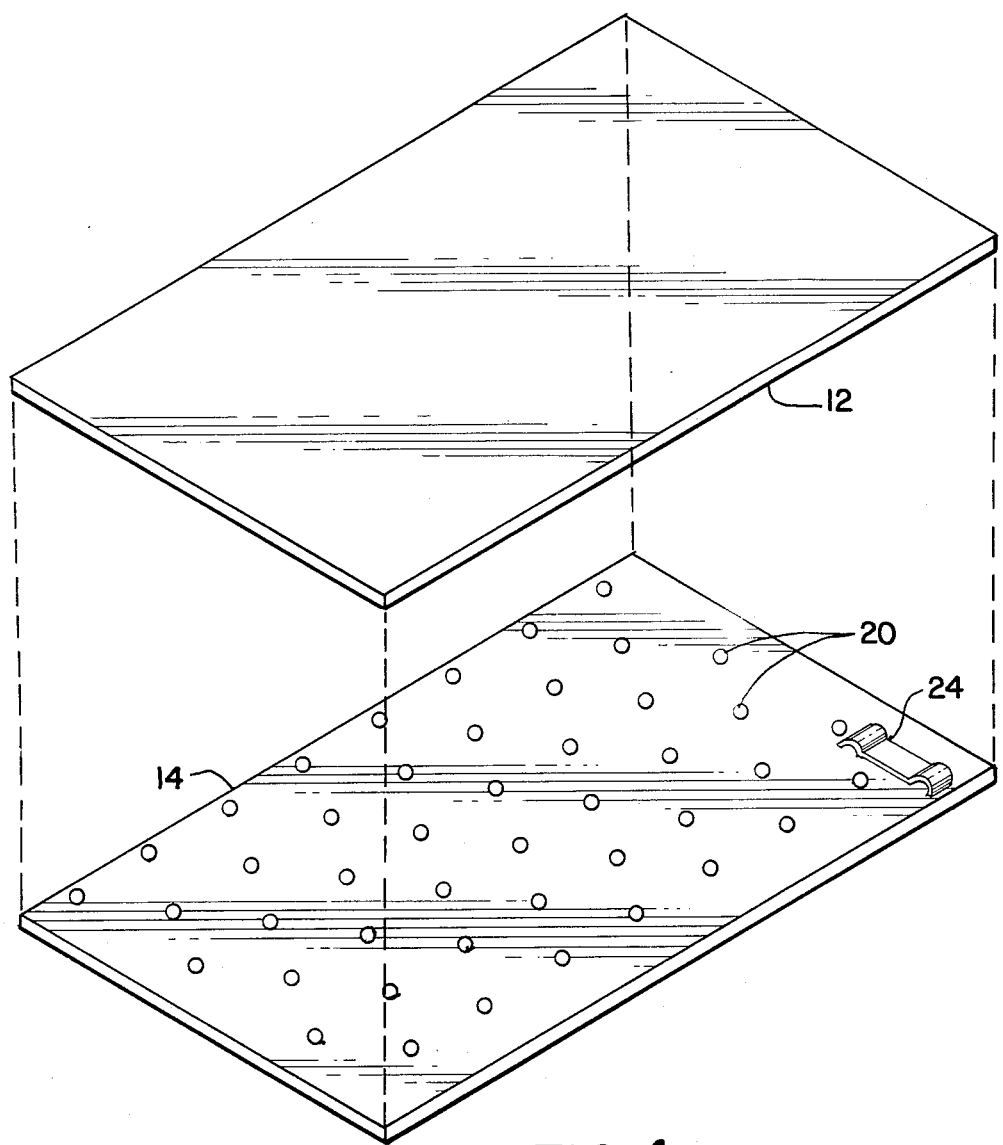
FIG. 4 is a perspective view of one of the glass panes with a plurality of glass beads affixed thereto before to assembly with the second glass panel.

The sealed vacuum insulating window panel 10 of the present invention is preferably constructed by using a laser to weld or seal the edges of the glass panels 12, 14 together. Before sealing the edges together, however, it is necessary to first deposit the selective transparent coating on the interior surface of at least one of the glass panes 12, 14. As mentioned above, it is preferred that a selective coating of a transparent layer of tin-doped indium oxide semiconductor material is deposited on the surface of the glass pane by a vacuum deposition or sputtering process. Then, the uniformly sized glass beads are attached to the interior surface of one of the glass panels 14, as shown in FIG. 4.

Uniformly sized spherical glass beads are inexpensive and readily available. They can be produced by persons skilled in the art, usually by spraying molten glass into a cool free-falling atmosphere. During the free fall, the droplets of molten glass solidify into almost perfect spheres. The spherical beads can be screened for sizing to obtain uniform sizes for particular glass panel applications. It is preferred that the spherical glass beads used in this invention be approximately 0.5 mm in diameter.

Figure 5:
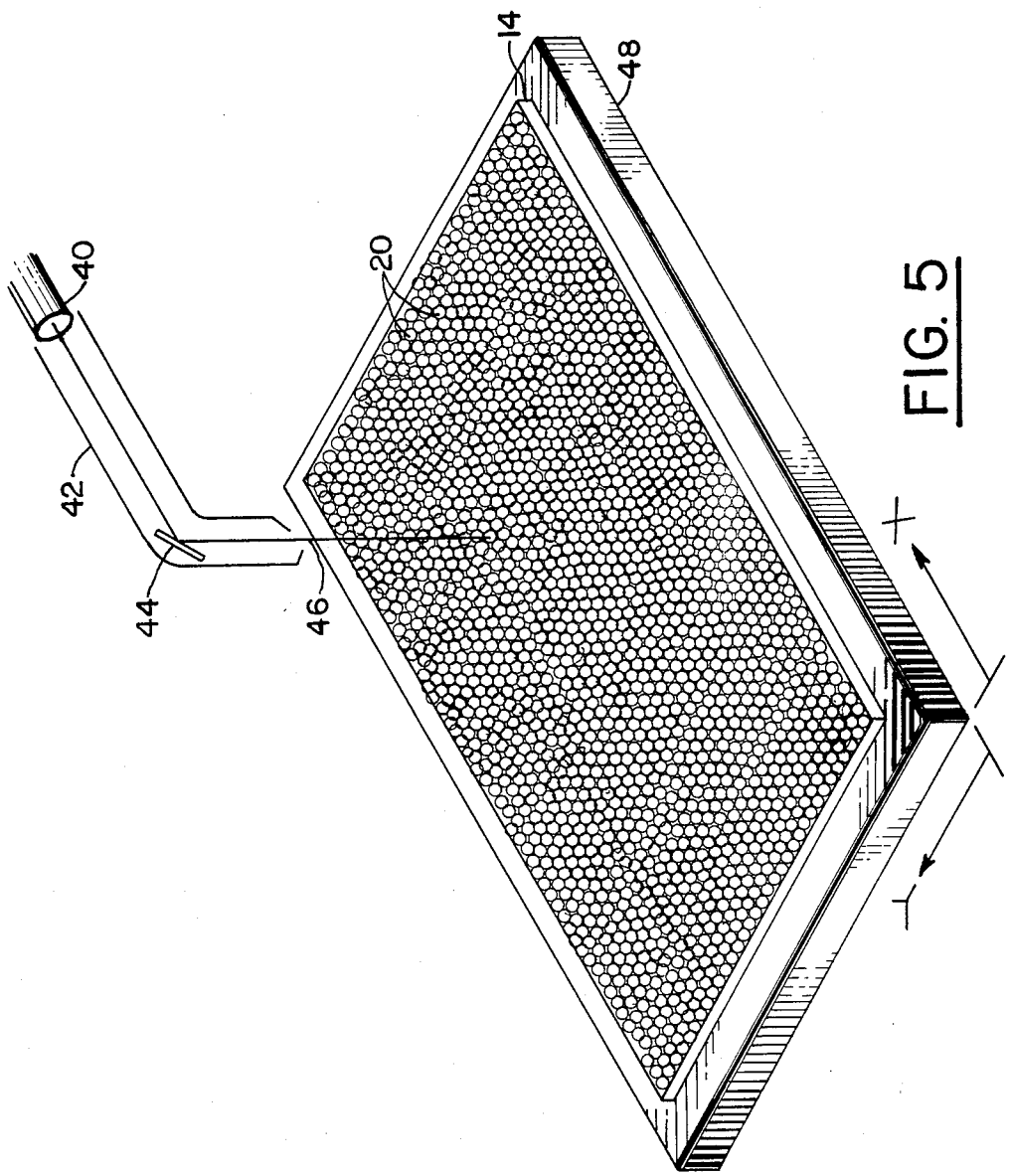
FIG. 5 is a perspective view illustrating a preferred method of affixing the glass beads to the glass pane.

The glass beads 20 can be affixed to the glass pane substrate 14 in a number of ways. One such method illustrated in FIG. 5 is to "flood" or completely cover the entire surface of the glass pane substrate 14 with uniformly sized glass beads 20. Then, a laser beam 46 can be used to spot weld the individual glass beads 20 in the desired locations on the glass pane substrate 14. A convenient method of accomplishing this task is to position the glass panel substrate 14 on a translation platform 48 that can be moved in predetermined precise X and Y directions under a stationary laser head. When the translation platform 48 is in the desired position, a laser beam 46 is produced by a laser head 40 and directed through a shroud 42 and relay mirror 44 to the surface of the glass pane substrate 14 as shown in FIG. 5.

Figure 6:
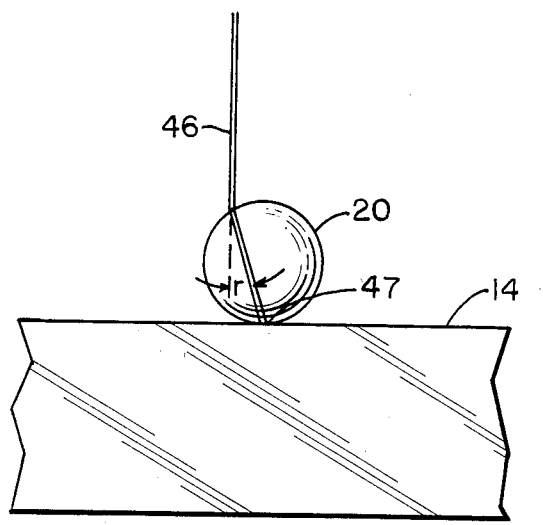
FIG. 6 is an enlarged elevation view illustrating the spot welding of a glass bead on the glass pane substrate.

If the laser beam 46 is aimed at the glass substrate 14 in a vertical orientation, as shown in FIG. 6, then it does not matter whether the laser beam 46 is perfectly aligned with any particular glass sphere 20. As shown in FIG. 6, it is the nature of a spherical body 20 to refract a beam 46 to the contact point 47 between the spherical bead 20 and the glass substrate 14 where the spot welding takes place, regardless of which point on the surface of the spherical bead 20 the beam 46 is incident. Therefore, with the surface of the glass substrate 14 folded with beads 20, as shown in FIG. 5, any place the laser beam 46 is aimed at the substrate 14 in a vertical orientation thereto, a glass bead 20 will be spot welded to the glass substrate 14 at that selected location. When the laser beam 46 has been aimed at all of the selected locations where one desires to affix a glass bead 20 to the glass substrate 14, the remainder of the glass beads can merely be dumped or poured off the surface of the substrate 14, leaving a selected number of glass beads 20 affixed to the surface of the glass pane 14 at selected positions as shown in FIG. 4. Spot welding the beads 20 to the glass panel 14 in this manner has the advantage of keeping the contact area between the beads 20 and the glass pane 14. The spot welds are also transparent, so they do not detract from the appearance of the window 10.

Figure 7:
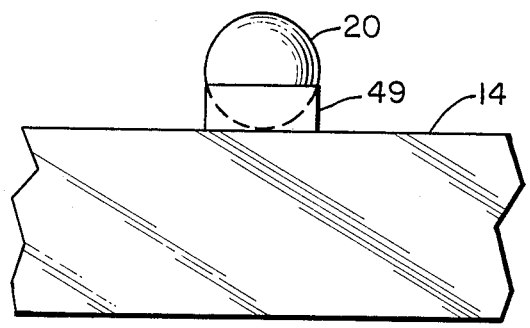
FIG. 7 is an enlarged elevation view illustrating an alternate method affixing the glass bead to the glass pane substrate with a sodium silicate solution.

FIG. 7 illustrates another method of attaching the glass beads 20 to the substrate 14. In this method, the glass beads 20 are dipped in a sodium silicate solution and positioned at the desired locations on the glass substrate 14. The sodium silicate solution will harden and adhere the glass bead 20 to the surface of the glass substrate 14. An advantage of this method is that the sodium silicate does not produce any gases, is transparent, and provides a durable adhesion or bonding of the glass bead 20 to the glass substrate 14. A disadvantage is that the hardened sodium silicate 49 provides a larger surface area on at least one glass pane 14 to which it is affixed for thermal transfer by conduction.

After the glass beads 20 are affixed at the desired locations to the glass pane 14, as shown in FIG. 4, the other glass pane 12 is positioned on the glass beads 20. Then, the metal getter 24 is positioned between the glass panels and, as best illustrated in FIG. 8, the assembly of glass panes 12, 14 and beads 20 is preferably positioned in a vacuum furnace 50 where the assembly can be heated to the annealing temperature of the glass while the edges 16 are sealed by a laser beam 76.

Figure 8:
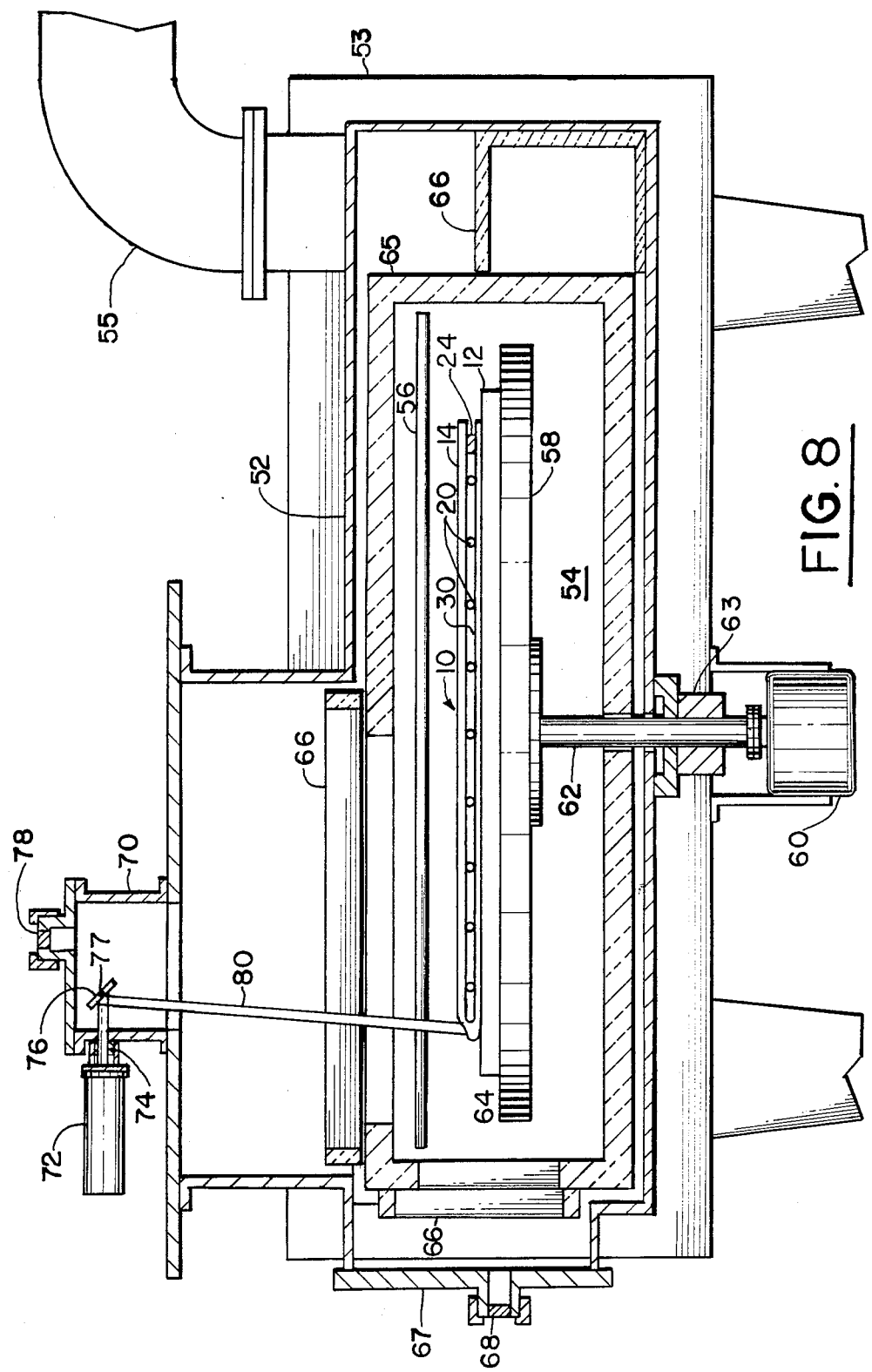
FIG. 8 is a cross-sectional view of a vacuum furnace arrangement suitably equipped for laser sealing of the edges of the evacuated thermal pane glass panel of the present invention.

A suitable vacuum furnace assembly 50 is illustrated in cross-section in FIG. 8. It includes a vacuum chamber 54 enclosed by a vacuum shell 52. Reinforcing housing 53 provides additional structural support for the vacuum shell 52. A rotatable turntable platform 58 is positioned in the chamber 54 to support the glass window panel 10 during laser welding. The turntable 58 is supported by a rotatable shaft 62 journaled in a water-cooled bearing 63. A stepper motor 60 connected to the shaft 62 rotates the turntable 58 in precisely measured increments of angular rotation in response to the stepper motor control apparatus (not shown).

The glass panel assembly 10 on the turntable is heated by a plurality of radiant heating elements, such as the radiant heating element 56 in FIG. 8 positioned over the turntable 58. Primary reflective insulation layers 65 protect the vacuum shell from the radiant heat in the chamber, and secondary reflective insulation layers 66 further shield structural and functional components of the furnace from the heat radiation. A view glass assembly 68 in removable end plate 67 allows an operator to view the interior of the chamber 54.

A laser optics housing unit 70 is mounted above the turntable platform 58 and has a laser head 72 mounted thereon. A relay mirror 76 is mounted on a pivotal axis 77 in laser optics housing 70 in alignment with a gallium arsenide laser window 74. The relay mirror 76 can direct laser beam 80 generated in the laser head 70 to a desired location on the turntable platform 58.

In use, the glass panel assembly 10 comprised of the glass panes 12, 14, glass bead spaces 20, and metal getter 24 is positioned in the vaccuum furnace 50 on a thermofax board insulator 64 on the platform 58. The furnace 50 is closed and sealed, and the chamber 54 is evacuated through port 55 to about $10^{-6}$ Torr pressure. Then the radiant heaters 56 heat the glass panel assembly 10 to its annealing temperature or slighly above. For borosilicate glass, which is the preferred glass suggested for this invention, the annealing temperature is approximately 565° C.; therefore, it is preferred that the glass assembly is heated to approximately 580° C., at which temperature the glass can deform slightly under stress without fracturing. While maintaining the glass assembly at or slightly above the annealing temperature, the laser beam 81 is directed at the edges of the glass panes 12, 14 to melt and weld them together to form a glass seal. The laser beam 76 must have sufficient energy to raise the temperature of the glass at the edges enough to melt it. The melting temperature for borosilicate glass is approximately 1200° C. to 1300° C. With the laser beam 80 melting the glass at the edges of the panes 12, 14, the turntable platform 58 is rotated by stepper motor 60 in the appropriate increments. Simultaneously, the relay mirror 76 is rotated at appropriate increments and speeds to slowly move the laser beam 76 around the entire edge of the glass panels 12, 14 until they are completely welded and sealed by a glass seal. By appropriately controlling the relay mirror 76 and the turntable 58 simultaneously, preferably by computer program, any pattern or configuration of glass panel 10 can have its edges laser welded to seal an evacuated space 30 therein as described above. This process can be watched through the view windows 68, 78. Of course, other vacuum furnace structures and laser control techniques can also be used to accomplish the laser welding of the glass edges of panel 10.

Once the entire edge of the glass panel assembly 10 is welded in a vacuum tight glass seal as described above, it is cooled. While the glass panel 10 is cooling from the 580° C. oven temperature, it will give off minute amounts of water vapor, carbon dioxide, and other miscellaneous gases such as nitrogen, oxygen, hydrocarbons, and the like. These gases are emitted into the space 30 between the panes 12, 14, as well as to the exterior. However, the reactive metal getter 24, positioned between the glass panes 12, 14, is activated at the high oven temperature during the sealing process. This metal getter 24, comprised preferably of an alloy of zirconium, vanadium and iron, will chemically react or combine with the minute amounts of gases produced during the cooling process to form solid compounds on the surface of the metal getter, thus virtually eliminating such gases from the space 30. With these gases eliminated, the $10^{-6}$ Torr vacuum is maintained in the space 30 and the likelihood of heat loss caused by to convection currents therein is virtually eliminated.

The amount of metal getter 24 to position in a particular evacuated glass panel 10 according to the present invention can be predetermined according to the size of the window panel 10 being produced. For example, an evacuated window panel, 10 of approximately one square meter requires a metal getter that is approximately 10 cm long by 0.08 cm wide by 0.35 cm thick, when the metal getter is an alloy of zirconium, vanadium and iron, as preferred in this invention. Other kinds of metal alloy getters can also be used for the same purpose.

While the above described laser welding edge seal is preferred, an alternative method of providing a glass edge seal is to use a glass solder technique. A solder glass is a powdered glass having a low melting temperature that can be used to bond glasses with higher softening or melting points together. In such an alternative embodiment, the powdered solder glass would have to be placed between the edges of the adjacent glass panes 12, 14. Then, the laser directed at the edges would not have to raise the temperature of the glass panes 12, 14 to their melting points but would merely have to be of sufficient energy to melt the powdered glass solder at lower melting points.

The foregoing description illustrates only the principles of the invention. Further, since numerous modifications and changes will readily occur to those skilled in the art, it is not desired to limit the invention to the exact construction and processes shown and described above. Accordingly, all suitable modifications and equivalents may be resorted to falling within the scope of the invention as defined by the claims that follow.

The embodiments of the invention in which an exclusive property or privilege is claimed are defined as follows:

1. A thermal resistant panel comprising two panes of glass positioned closely spaced apart in substantially parallel relation to each other, a plurality of spherical glass bead spacers positioned between said two panes of glass to maintain the spacing while minimizing the thermal conduction between said panes, and a continuous glass joint around the periphery of said panel sealing the edges of said two panes together.

2. The thermal resistant panel of claim 1, wherein the space between said glass panes is evacuated.

3. The thermal resistant panel of claim 2, wherein the space between said glass panes is evacuated to a pressure in the range of $10^{-5}$ to $10^{-6}$ Torr.

4. The thermal resistant panel of claim 2, including getter means positioned in said evacuated space between said glass panes.

5. The thermal resistant panel of claim 3, wherein said getter means is an activated metal alloy comprising zirconium, vanadium, and iron.

6. The thermal resistant panel of claim 1, wherein said glass beads are in the range of about 0.3 mm to 1.0 mm in diameter.

7. The thermal resistant panel of claim 1, wherein said glass beads are affixed to one of said panels.

8. The thermal resistant panel of claim 1, including transparent selective coating means on the surface of one of said glass panes for allowing solar radiation and light in the visible spectrum to pass therethrough while reflecting infrared heat radiation that is not in the visible spectrum.

9. The thermal resistant panel of claim 1, wherein said panel includes an insulated baffle around the periphery of said panel enclosing said glass joint in said insulated baffle.

10. A thermal resistant panel conprising two panes of glass positioned closely spaced apart in relation to each other, at least one surface of one of said panes of glass having deposited thereon a layer of material that is transparent to solar radiation and light in the visible spectrum and reflective to infrared heat radiation that is not in the visible spectrum, a plurality of spherical glass bead spacers attached to one of said panes of glass and positioned in the space between said two panes of glass to maintain the spacing while minimizing the thermal conduction between said panes of glass, a continuous welded glass joint around the periphery of said panel sealing the edges of said two panes of glass together, and a vacuum in the space between said panes of glass.

11. A process of producing a thermal resistant panel comprising the steps of positioning two glass panes closely spaced apart in relation to each other, positioning a plurality of spherical glass bead spacers between said panes to maintain the spacing while minimizing the thermal conduction between said panes, evacuating the atmosphere around said panes, and joining the edges of said glass panes together to form a completely glass seal around the periphery of the panel.

12. The process of claim 11, including the step of glass soldering the edges of said glass panes together.

13. The process of claim 11, including the step of affixing a plurality of glass bead spacers to one of said glass panes by flooding the surface of said pane with a plurality of beads and then spot laser welding selected numbers thereof to said surface before welding the edges of said glass panes together.

14. The process of claim 12, including the step of affixing a plurality of glass bead spacers to one of said glass panes before welding the edges of said glass panes together.

15. The process of claim 12, including the step of welding the edges of said glass panes together by directing a laser beam at such edges of sufficient power to raise the temperature of the glass at the edges of the panes to the melting point.

16. The process of claim 15, including the step of heating said glass panes to at least the annealing temperature of the glass and maintaining such temperature during the laser welding of the edges together.

17. The process of claim 16, including the step of positioning metal getter means in the space between the glass panes prior to heating and welding the edges.

18. The process of claim 12, including the step of depositing a material on a surface of one of said glass panes that is transparent to solar radiation and visible light and reflective to infrared heat radiation that is not in the visible spectrum.

19. The process of claim 18, including the step of sputter depositing a layer of tin-doped indium oxide semiconductor material on a surface of one of said glass panes.

* * * * *